United States Patent [19]

Anderson et al.

[11] 4,132,652
[45] Jan. 2, 1979

[54] SLOTTED BAFFLE FOR USE IN SEPARATING OIL-WATER MIXTURES

[75] Inventors: David K. Anderson, Coalinga; Marvin A. Stewart, Avenal, both of Calif.

[73] Assignee: Chevron Research Company, San Francisco, Calif.

[21] Appl. No.: 841,183

[22] Filed: Oct. 11, 1977

[51] Int. Cl.² ............................................. B01D 17/02
[52] U.S. Cl. ................................ 210/536; 210/DIG. 5
[58] Field of Search .................... 210/242 S, 23, 536, 210/DIG. 5, 320, 521, 522, 537, 532 R, DIG. 25, DIG. 26, 730 W, 83, 84

[56] References Cited

U.S. PATENT DOCUMENTS

| | | | |
|---|---|---|---|
| 2,661,094 | 12/1953 | Stewart | 210/242 S |
| 3,529,728 | 9/1970 | Middelbeck et al. | 210/522 |
| 3,771,662 | 11/1973 | Muramatsu et al. | 210/242 |
| 3,933,564 | 1/1976 | Middelbeck | 210/521 |
| 4,064,054 | 12/1977 | Anderson et al. | 210/536 |

Primary Examiner—Charles N. Hart
Assistant Examiner—E. Rollins Cross
Attorney, Agent, or Firm—R. L. Freeland, Jr.; Edward J. Keeling

[57] ABSTRACT

An improved baffle for use in an oil-water separation tank including a perpendicular solid portion and an inclined slotted portion extending downwardly and inwardly in the direction of flow from the lower edge of the perpendicular solid portion, the slotted portion having at least three rows of downwardly spaced apart slots extending laterally across the slotted portion, the uppermost of said rows an averge of from ½ to 2 slots per lateral meter and each of the lower rows therefrom having at least 25% more slots than said uppermost row.

4 Claims, 2 Drawing Figures

{ 4,132,652 }

SLOTTED BAFFLE FOR USE IN SEPARATING OIL-WATER MIXTURES

FIELD OF THE INVENTION

The present invention relates to separating on the surface oil and water produced from a well, and more particularly the present invention relates to an improved baffle section useful in an oil-water separation tank to promote the separation of oil and water therein. The baffle section includes a solid perpendicular portion and an inclined portion containing downwardly separated rows of slots wherein the density of slots in each row increases in a downward direction.

BACKGROUND OF THE INVENTION

Produced fluids coming from an oil well often include a mixture of petroleum, connate water and hydrocarbon gas. In order to prepare the produced fluids for handling, i.e., transportation of the petroleum and gas and disposal of the water, the mixture must be separated into separate components. Since gas in most instances will readily separate from the mixture under conditions prevaling at the surface, the principal problem is separating the produced water from the oil. Water and oil, of course, have different densities and will gravity-separate from each other if left standing long enough. However, this requires a great deal of storage space, which can be very undesirable.

Many types of wash tanks have been used heretofore to separate the oil from water. These tanks have used heat, chemicals and baffles to promote separation of the oil and water. The tanks use various arrangements to assist separation of the two fluids so that the oil may be withdrawn from the top of the tank and water withdrawn from the bottom of the tank.

A baffled wash tank is described in copending application Ser. No. 753,047, now U.S. Pat. No. 4,064,054, issued Dec. 20, 1977. As there described, baffle sections are connected across the tank to prevent channeling of the oil-water mixture and thus to promote separation of oil and water. Each baffle section extends completely across the tank. The baffle section includes a perpendicular solid portion extending from above the inlet for the oil-water mixture in the tank to a position below the inlet for the oil-water mixture. The perpendicular solid portion of the baffle section is arranged substantially normal to the axis of flow of the oil-water mixture in a downward direction. The baffle section also includes an inclined slotted portion extending downwardly in the direction of flow from the lower edge of the perpendicular solid portion. The slotted portion utilizes rows of regularly spaced slots to assist in the separation of the oil and water. The above-described tank effectively promotes the separation of oil and water so as to permit a relatively small tank to be used, thus saving space and improving the transit time through the tank. However, it has been discovered that even more efficient operation can be achieved when the number of slots in the lower rows of slots in the inclined slotted portion of the baffle are increased in number over the number of slots in the upper row of slots.

BRIEF DESCRIPTION OF THE INVENTION

The present invention provides an improved baffle section for use in an oil-water separation tank. The improved baffle includes a perpendicular solid portion and an inclined slotted portion extending downwardly and inwardly in the direction of flow from the lower edge of the perpendicular solid portion. The slotted portion has at least 3 rows of downwardly spaced-apart slots. Each row extends laterally across the slotted portion. The uppermost of the rows has an average of from $\frac{1}{2}$ to 2 slots per lateral meter. Each of the lower rows therefrom has at least 25% more slots than the uppermost row. In a more specific arrangement, the second-most upper row has 25% more slots than the uppermost row and each of the lower rows therefrom has 25% more slots than the second-most upper row. The rows of slots are preferably downwardly spaced apart by at least a distance equal to the length of the slots.

In the preferred embodiment, the improved baffle sections of the present invention are utilized in a vessel or tank for separating an oil-water mixture. An inlet for an oil-water mixture is formed in the side of the tank above the horizontal centerline thereof. An outlet for oil is provided on the opposite side of the tank away from the inlet. The outlet for oil is also above the horizontal centerline of the tank and slightly below the oil-water inlet. An outlet for water is also formed in the opposite side of the tank below the outlet for oil and near the bottom of the tank. Control means are used to control the flow of the oil-water mixtures into the tank through the inlet and out of the tank through the outlets. The control means permit establishment and maintenance of a predetermined liquid level within the tank. The control means provide for maintaining such a liquid level within the tank by adjusting the rates of the oil-water mixture into the tank and of water and oil from the tank. The improved baffle section is connected across the tank to prevent channeling of the oil-water mixture and to thus promote separation of oil and water. The baffle section includes a perpendicular solid portion extending from above the inlet for the oil-water mixture in the tank to a position below the inlet for the oil-water mixture. The perpendicular solid portion of the baffle section is arranged substantially normal to the axis of flow of the oil-water mixture in the tank to divert the flow of the oil-water mixture in a downward direction. The baffle section also includes an inclined slotted portion extending downwardly in the direction of flow from the lower edge of the perpendicular solid portion. There are substantially more slots in the lower part of the inclined portion than in the upper part of the inclined portion to better assist the separation process.

OBJECTS OF THE INVENTION

A particular object of the present invention is to provide an improved baffle section for facilitating the separation of oil from water in a separation tank. Further objects and advantages of the present invention will become apparent from the following detailed description, read in light of the accompanying drawings, which are made a part of this specification.

DETAILED DESCRIPTION OF THE PREFERRED EMBODIMENT

Figure 2:
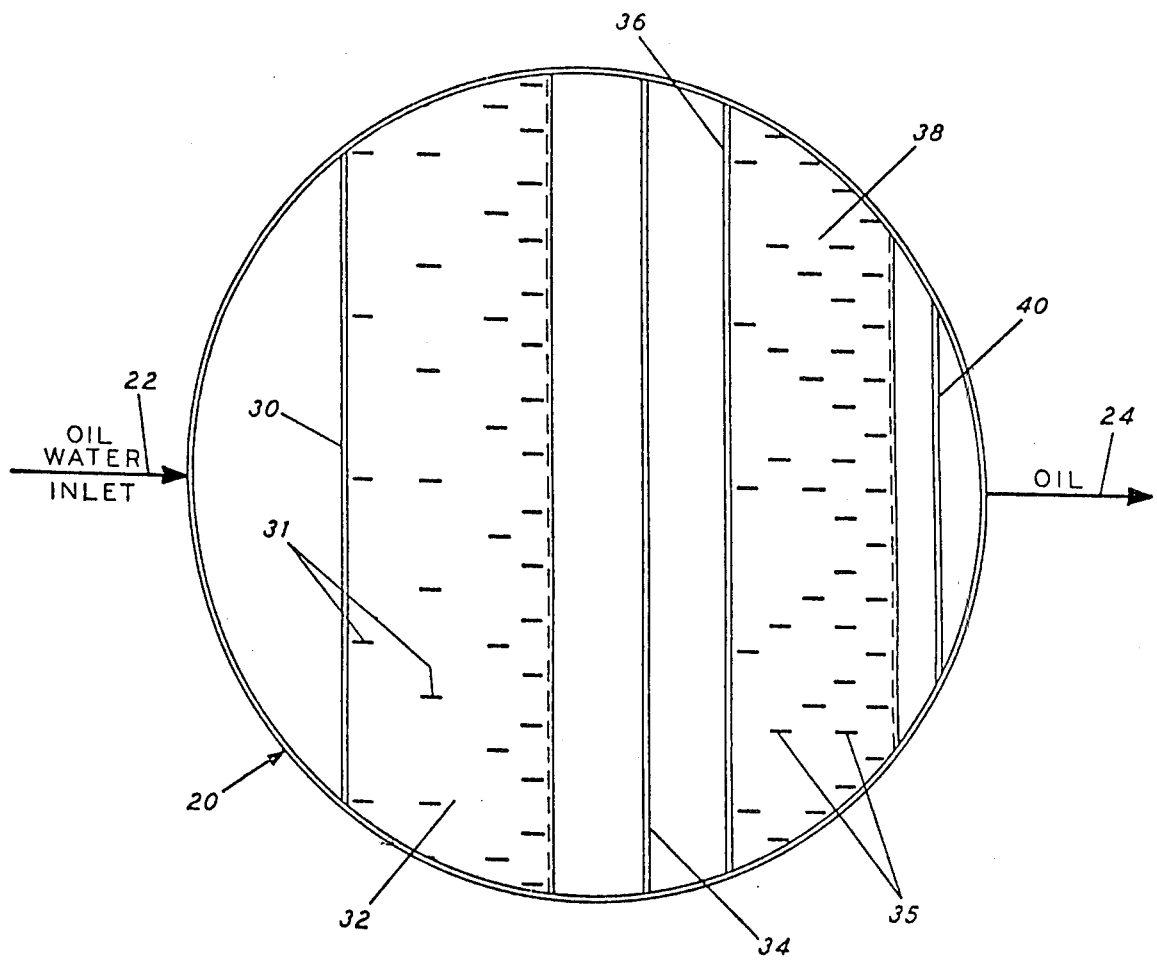
FIG. 2 is a sectional view taken at line 2—2 of FIG. 1.
Figure 1:
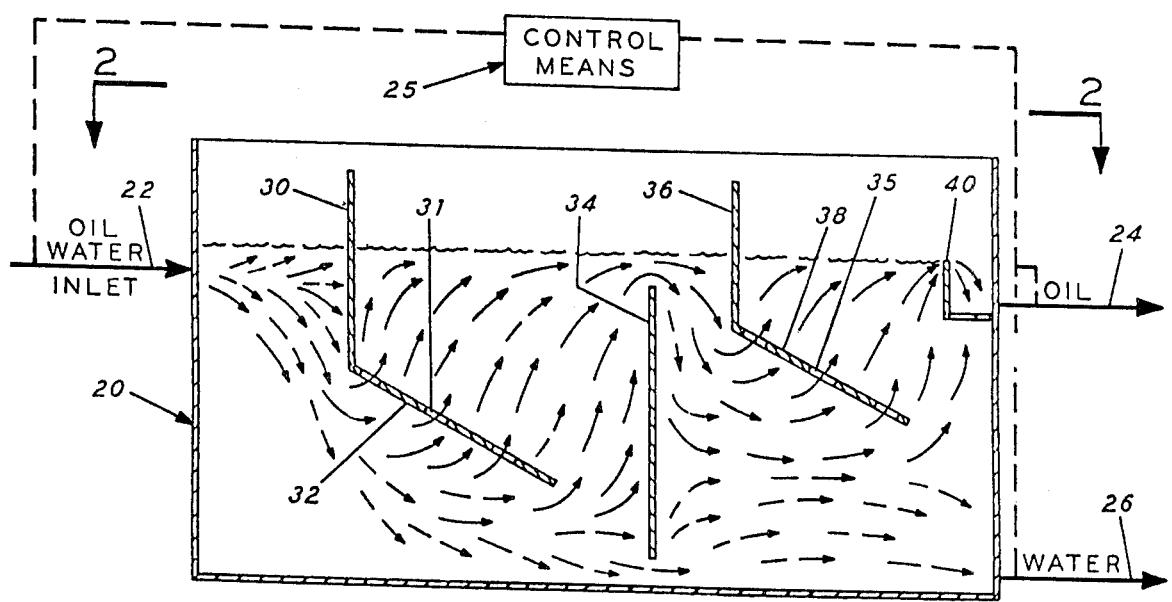
FIG. 1 is an elevation view with portions broken away for clarity of presentation and illustrates two baffle sections formed in accordance with the present invention positioned in a wash tank.

A wash tank indicated generally by the number 20 is shown for use in separating an oil-water mixture. An inlet 22 for an oil-water mixture is formed in the side of the tank above the horizontal ceneterline thereof. The oil-water mixture may be, for example, production from one or more oil wells. An outlet 24 for oil is provided on the opposite side of the tank away from the oil-water inlet 22. An outlet 26 for water is also formed in the opposite side of the tank below the outlet 24 for oil and near the bottom of the tank. Control means 25 are used to control the flow of the oil-water mixtures into the tank 20 through the inlet 22 and out of the tank through the outlets 24, 26. The control means permit establishment and maintenance of a predetermined liquid level within the tank. The control means provide for maintaining such a liquid level within the tank by adjusting the flow rates from the oil-water mixture into the tank and of water and oil from the tank. The flow rates are usually adjusted to provide minimum residence time in the tank sufficient for the desired degree of separation of oil and water.

Two different baffle sections, both assembled in accordance with the present invention, are connected across the tank to prevent channeling of the oil-water mixture and thus to promote separation of oil and water. Both baffle sections extend completely across the tank. The first baffle section includes a perpendicular solid portion 30 extending from above the inlet 22 for the oil-water mixture in the tank to a position below the inlet for the oil-water mixture 22. The perpendicular solid portion 30 of the first baffle section is arranged substantially normal to the axis of flow of the oil-mixture into the tank through the inlet 22 and is spaced apart from the inlet to divert the incoming flow of the oil-water mixture in a downward direction. The first baffle section also includes an inclined slotted portion 32 extending downwardly in the direction of flow from the lower edge of the perpendicular solid portion. The flow patterns are indicated by arrows. Solid arrows indicate oil and dashed arrows indicate water. There are at least three laterally extending rows of downwardly spaced-apart slots 31 in the inclined portion. The number of slots in each of the lower rows is at least 25% greater than the number of slots in the uppermost row. The uppermost row should have an average of between about ½ to 2 slots per lateral meter. The number and size of the slots will vary to some extent, depending on the viscosity of the oil and the rate of flow through the tank. The inclined slotted portion 32 preferably forms an angle of about 135° with the perpendicular solid portion 30. Angles of from 110° to 150° have been found to be satisfactory. The slots 31 in the inclined portion 32 are preferably on the order of 4" by ¼".

A third baffle section, assembled in accordance with the invention, is spaced downstream from the first baffle section and extends completely across the tank. The second baffle section includes a solid perpendicular portion 36 extending from above the projected liquid level in the tank to a position below the liquid level to again divert the flow of the oil-water mixture in a downward direction. The solid perpendicular portion is in parallel spaced-apart relationship with the perpendicular portion 30 of the first baffle section. The second baffle section also includes an inclined slotted portion 38 extending downwardly in the direction of flow from the lower edge of the solid perpendicular portion. This position also contains slots 35 to permit oil to flow through the slotted portion 38, which preferably makes an angle of about 135° with the perpendicular portion 36. Angles of from 110° to 150° are suitable. There are more slots 35 in lower rows than in the uppermost row. There are at least three spaced-apart rows of slots. The uppermost row has an average number of slots in the range of from ½ to 2 slots per lateral meter. The second-most upper row has at least 25% more slots than the uppermost row. Each of the lower rows has at least 25% more slots than the second-most upper row. In this baffle, the rows of slots are not separated by a lateral unslotted portion.

In a typical oil-water separation operation utilizing the improved baffles, the oil-water mixture is preheated to a temperature between about 150° F. and 180° F. The oil-water mixture is flowed into a tank above the horizontal centerline thereof at a rate which depends upon a number of factors, including the size of the tank, the characteristics of the oil and the degree of separation desired.

The oil-water mixture enters the tank slightly above the fluid level. Six to 12 inches is preferred. The crude is defoamed and degassed immediately upon entering the tank. Heat and chemicals may be used. The oil-water mixture spreads out laterally as it contacts the first solid baffle 30. The oil and water travel in a downward direction, with the free water dropping to the bottom of the tank. The oil and water are forced down and spread along the first slotted portion 32. As the mixture works its way up through the slots 31, the oil rises to the top of the tank. The wetter oil is carried down lower on the baffle and is forced close to the oil-water interface. As oil and water strike a middle baffle 34, the free water continues under the baffle. The oil travels up and close to the clean oil at the top of the tank before it starts its descent over the middle baffle 34. The clean oil near the surface of the tank between the perpendicular portion 30 and perpendicular portion 36 is forced down again and commingles with the slightly drier oil spilling over the middle baffle 34. The clean oil then finds its way up through the slots 35 in the inclined slotted portion 38. The oil spreads out as it rises to the surface behind this baffle and is then pulled toward the skimmer 40. The water is pulled off near the bottom of the tank.

Although only certain specific embodiments of apparatus have been described herein, the invention is not limited to only these embodiments, but rather by the scope of the appended claims.

What is claimed is:

1. An improved baffle section for use in an oil-water separation tank comprising a perpendicular solid portion and an inclined slotted portion extending downwardly and inwardly in the direction of flow from the lower edge of said perpendicular portion, said slotted portion having at least 3 rows of downwardly spaced-apart slots, each row extending laterally across said slotted portion, the uppermost of said rows having an average of from ½ to 2 slots per lateral meter and each of the lower rows therefrom having at least 25% more slots than said uppermost row.

2. The baffle section of claim 1 further characterized in that the second-most upper row has at least 25% more slots than said uppermost row and each of the lower rows therefrom has at least 25% more slots that said second-most upper row.

3. The baffle section of claim 1 wherein each row is downwardly spaced apart by at least a distance equal to the length of the slots 4. The baffle section of claim 3 wherein the length of each slot is 4" and the width is ¼".

* * * * *